(12) United States Patent
Kay et al.

(10) Patent No.: US 7,241,813 B2
(45) Date of Patent: *Jul. 10, 2007

(54) END-CAPPED POLYMERS AND COMPOSITIONS CONTAINING SUCH COMPOUNDS

(75) Inventors: John F. Kay, Encinitas, CA (US); John J. Eisch, Vestal, NY (US)

(73) Assignee: IsoTis OrthoBiologics, Inc., Irvine, CA (US)

( * ) Notice: Subject to any disclaimer, the term of this patent is extended or adjusted under 35 U.S.C. 154(b) by 603 days.

This patent is subject to a terminal disclaimer.

(21) Appl. No.: 10/326,339

(22) Filed: Dec. 20, 2002

(65) Prior Publication Data

US 2003/0175322 A1 Sep. 18, 2003

Related U.S. Application Data

(60) Provisional application No. 60/345,113, filed on Dec. 21, 2001.

(51) Int. Cl.
*A61K 47/00* (2006.01)

(52) U.S. Cl. .................. 514/772.1; 424/400; 424/484; 424/486; 424/489; 424/500; 424/501; 514/772

(58) Field of Classification Search ............... None
See application file for complete search history.

(56) References Cited

U.S. PATENT DOCUMENTS

| | | | |
|---|---|---|---|
| 2,520,611 A | 8/1950 | Roberts et al. | |
| 2,520,612 A | 8/1950 | Roberts et al. | |
| 2,674,619 A | 4/1954 | Lundsted | |
| 3,393,179 A | 7/1968 | Leverett | |
| 3,393,242 A | 7/1968 | Seale et al. | |
| 3,393,243 A | 7/1968 | Cuscurida | |
| 3,653,183 A | 4/1972 | Sanders et al. | |
| 3,833,725 A | 9/1974 | Thompson | |
| 4,011,313 A | 3/1977 | Thompson | |
| 4,051,132 A * | 9/1977 | Firestone | 540/220 |
| 4,301,083 A | 11/1981 | Yoshimura et al. | |
| 4,330,677 A | 5/1982 | Linke et al. | 562/583 |
| 4,394,370 A | 7/1983 | Jefferies et al. | |
| 4,439,420 A * | 3/1984 | Mattei et al. | 424/78.38 |
| 4,472,840 A | 9/1984 | Jefferies et al. | |
| 4,587,365 A | 5/1986 | Anchor | |
| 4,595,713 A | 6/1986 | St. John | |
| 4,764,567 A | 8/1988 | Ott | |
| 4,902,834 A | 2/1990 | Otten et al. | |
| 4,922,029 A | 5/1990 | Birnbach et al. | |
| 4,975,526 A | 12/1990 | Kuberasampath et al. | |
| 4,994,626 A | 2/1991 | Greenough et al. | |
| 5,073,373 A | 12/1991 | O'Leary et al. | |
| 5,108,753 A | 4/1992 | Kuberasampath et al. | |
| 5,130,413 A | 7/1992 | Asai et al. | |
| 5,171,574 A | 12/1992 | Kuberasampath et al. | |
| 5,284,655 A | 2/1994 | Bogdansky et al. | |
| 5,290,558 A | 3/1994 | O'Leary et al. | |
| 5,292,516 A | 3/1994 | Viegas et al. | |
| 5,306,304 A | 4/1994 | Gendler | |
| 5,306,501 A | 4/1994 | Viegas et al. | |
| 5,330,768 A | 7/1994 | Park et al. | |
| 5,346,703 A | 9/1994 | Viegas et al. | |
| 5,356,629 A | 10/1994 | Sander | |
| 5,464,439 A | 11/1995 | Gendler | |
| 5,503,558 A | 4/1996 | Clokie | |
| 5,516,532 A | 5/1996 | Atala et al. | |
| 5,520,923 A | 5/1996 | Tjia et al. | |
| 5,593,683 A | 1/1997 | Viegas et al. | |
| 5,648,557 A | 7/1997 | Wei | |
| 5,702,695 A | 12/1997 | Clokie | |
| 5,707,962 A | 1/1998 | Chen et al. | |
| 5,733,868 A | 3/1998 | Peterson | |
| 5,766,704 A | 6/1998 | Allen et al. | |
| 5,837,235 A | 11/1998 | Mueller et al. | |
| 5,854,382 A | 12/1998 | Loomis | |
| 5,861,174 A | 1/1999 | Stratton et al. | |

(Continued)

FOREIGN PATENT DOCUMENTS

EP 0 268 920 A 6/1988

(Continued)

OTHER PUBLICATIONS

Pine, Organic Chemistry, 1987 (5th Edition) pp. 78, 98-102, 122-123, 323, 328, 329, 350, 351, 361-364, 378, 379, Title page, copyright page.*

(Continued)

*Primary Examiner*—Michael P. Woodward
*Assistant Examiner*—Eric E. Silverman
(74) *Attorney, Agent, or Firm*—Banner & Witcoff, Ltd.

(57) ABSTRACT

End-capped polymers, methods for making those end-capped polymers and compositions containing those end-capped polymers are disclosed. One of the disclosed end-capped copolymers has the formula:

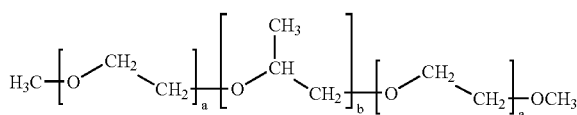

and may be combined with demineralized bone particles to form a tissue repair composition.

9 Claims, No Drawings

U.S. PATENT DOCUMENTS

| | | | |
|---|---|---|---|
| 5,904,716 A | 5/1999 | Gendler | |
| 5,910,315 A | 6/1999 | Stevenson et al. | |
| 5,916,553 A | 6/1999 | Schmidt | |
| 5,939,157 A | 8/1999 | Allen et al. | |
| 5,952,077 A | 9/1999 | Booth et al. | |
| 5,955,159 A | 9/1999 | Allen et al. | |
| 5,968,556 A | 10/1999 | Atala et al. | |
| 5,985,383 A | 11/1999 | Allen et al. | |
| 6,005,020 A | 12/1999 | Loomis | |
| 6,028,164 A | 2/2000 | Loomis | |
| 6,030,635 A | 2/2000 | Gertzman et al. | |
| 6,033,438 A | 3/2000 | Bianchi et al. | |
| 6,133,211 A | 10/2000 | Cobianco et al. | |
| 6,136,029 A | 10/2000 | Johnson et al. | |
| 6,180,605 B1 | 1/2001 | Chen et al. | |
| 6,180,606 B1 | 1/2001 | Chen et al. | |
| 6,189,537 B1 | 2/2001 | Wolfinbarger, Jr. | |
| 6,201,065 B1 | 3/2001 | Pathak et al. | |
| 6,206,923 B1 | 3/2001 | Boyd et al. | |
| 6,214,049 B1 | 4/2001 | Gayer et al. | |
| 6,281,195 B1 | 8/2001 | Rueger et al. | |
| 6,305,379 B1 | 10/2001 | Wolfinbarger, Jr. | |
| 6,309,659 B1 | 10/2001 | Clokie | |
| 6,311,690 B1 | 11/2001 | Jefferies | |
| 6,316,011 B1 | 11/2001 | Ron et al. | |
| 6,316,522 B1 | 11/2001 | Loomis et al. | |
| 6,403,758 B1 | 6/2002 | Loomis | |
| 6,409,765 B1 | 6/2002 | Bianchi et al. | |
| 6,410,645 B1 | 6/2002 | Pathak et al. | |
| 6,425,920 B1 | 7/2002 | Hamada | |
| 6,426,332 B1 | 7/2002 | Rueger et al. | |
| 6,437,018 B1 | 8/2002 | Gertzman et al. | |
| 6,623,729 B2 * | 9/2003 | Park et al. | 424/78.17 |
| 6,623,748 B2 | 9/2003 | Clokie | 424/422 |
| 2001/0008317 A1 | 7/2001 | Gaylo et al. | |
| 2001/0020188 A1 | 9/2001 | Sander | |
| 2001/0038848 A1 | 11/2001 | Donda et al. | |
| 2001/0043940 A1 | 11/2001 | Boyce et al. | |
| 2002/0022883 A1 | 2/2002 | Burg | |
| 2002/0034531 A1 | 3/2002 | Clokie | |
| 2002/0106393 A1 | 8/2002 | Bianchi et al. | |
| 2002/0107570 A1 | 8/2002 | Sybert et al. | |
| 2002/0120335 A1 | 8/2002 | Angelucci et al. | |
| 2002/0160032 A1 | 10/2002 | Long et al. | |
| 2002/0161443 A1 | 10/2002 | Michelson | |

FOREIGN PATENT DOCUMENTS

| | | |
|---|---|---|
| WO | WO 98/35631 | 8/1998 |
| WO | WO 99/11298 | 3/1999 |
| WO | WO 99/13099 | 3/1999 |

OTHER PUBLICATIONS

Solomons, "Organic Chemistry", 1976 pp. 236, 459, 461, 462.*
Odian "Principles of Polymerization" 1991, p. 695.*
Schmolka, "A Review of Block Polymer Surfactants," *J. Am. Oil Chemists Soc.* 54:110-116 (1977).
Schmolka, "A Comparison of Block Polymer Surfactant Gels," *J. Am. Oil Chemists Soc.* 68:206-209 (1991).

* cited by examiner

END-CAPPED POLYMERS AND COMPOSITIONS CONTAINING SUCH COMPOUNDS

This application claims priority under 35 U.S.C. § 119 to U.S. Provisional Patent Application Ser. No. 60/345,113, filed Dec. 21, 2001, which is incorporated herein by reference.

This invention relates to end-capped polymers and compositions containing such compounds. In particular, the compounds may be used as carriers for active ingredients, such as carriers for bone tissue or bone proteins.

BACKGROUND OF THE INVENTION

When active ingredients are therapeutically administered to a patient, they are often contained in a carrier. In the context of tissue repair, demineralized bone powder is often used as the active ingredient to induce new bone growth at a bone defect site. Demineralized bone powder can be a loose, powdery material that is not easily contained at a bone defect site, particularly in the presence of body fluids and surgical irrigation. Therefore, demineralized bone powder may be combined with a carrier in order to provide a composition with improved handling characteristics and the ability to stay in place at the bone defect site for a sufficient amount of time to effect new bone growth.

Demineralized bone powder is a material that can be prepared by conventional procedures. Demineralized bone powder is generally composed of particles of bone tissue that have been specially treated, generally by soaking in acid, to remove their mineral content. The resulting demineralized bone powder is composed mainly of highly cross-linked collagen. The remaining non-collagenous proteins include proteins such as TGF-$\beta$, PDGF, osteopontin, osteonectin, bone morphogenetic proteins (BMPs), and others. BMPs are a group of proteins categorized in the transforming growth factor beta super-family of proteins.

Isolated BMPs are another material that can induce the formation of new bone and that can be prepared by conventional procedures. To date, several BMPs have been isolated and associated with the bone healing process. BMPs can be isolated from bone as a mixture of proteins or produced individually through recombinant gene technology.

Demineralized bone powder and BMPs have been combined with carriers to produce bone repair compositions. Jefferies (U.S. Pat. No. 4,394,370) discloses tissue repair compositions containing demineralized bone powder, BMPs, or both in a reconstituted collagen matrix. Glowacki et al. (U.S. Pat. No. 4,440,750) discloses aqueous compositions of demineralized bone particles and reconstituted collagen fibers.

Clokie (U.S. Pat. No. 6,309,659) describes a biocompatible connective tissue repair composition comprising bone powder and a carrier of poloxamer 407 (also known as Pluronic® F127, manufactured by BASF Corporation) and water. Pluronic® F127 is a polyoxyethylene-polyoxypropylene-polyoxyethylene triblock copolymer of the formula:

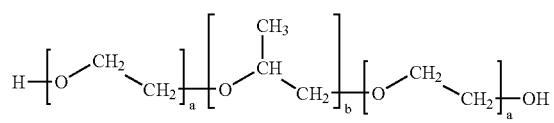

wherein a is about 101 and b is about 56. This molecule has two hydroxyl groups (—OH), one at each of the far ends of the long polymeric molecule. At particular concentrations and temperatures, a composition of Pluronic F127 and water exhibits reverse phase thermal characteristics in that it can form a gel and become increasingly viscous or solidified as its temperature increases.

Shimura et al. (International Patent Application No. WO97/18829) describes a composition that contains a polyoxyethylene-polyoxypropylene glycol (e.g., ADEKA® F127) and a bone morphogenetic protein, and reportedly displays a reverse phase characteristic.

There is a continuing need in the art for carriers for active ingredients and, in particular, for carriers to be used in tissue repair compositions.

SUMMARY OF THE INVENTION

This invention relates to end-capped polymers and compositions containing such compounds. The invention further relates to the method of making such end-capped polymers. In a preferred embodiment, a polymer containing a hydroxyl group (—OH) at one or both ends is treated to remove and replace the hydrogen portion of the hydroxyl end group(s) with a different functional group. Preferably, the hydrogen of the hydroxyl group is replaced with a less reactive functional group and, thereby, the polymer can be used as a carrier that is less reactive.

The end-capped polymers according to the invention can be used as carriers for active ingredients, particularly biologically active ingredients. In a preferred embodiment, the end-capped polymer is a carrier component in a tissue repair composition. More preferably, the tissue repair composition according to the invention comprises an end-capped polymer and one or more bone tissue, collagen tissue, bone protein or combinations or derivatives of those materials. Such tissue repair compositions may be applied to a bone defect site, cartilage defect site, or other musculoskeletal sites. The composition can be applied by syringe, spatula, or other surgical delivery means. The inventive compositions can also be used as a coating on surgical implants to be inserted at or near bone defect sites, cartilage defect sites, or other musculoskeletal sites.

DESCRIPTION OF ILLUSTRATIVE EMBODIMENTS

The invention relates to end-capped polymers and compositions containing such compounds. The invention also relates to the method of preparing those end-capped polymers and the compositions made with those compounds.

Polymers are long molecules that may be in the form of homopolymers (containing a single type of monomer unit) or copolymers (containing two or more types of monomer units). Many polymers have hydroxyl (—OH) end groups. The compounds according to the invention are polymers that have one or more such hydroxyl groups removed.

For examples, polymers such as polyalkylene glycols, certain polyorthoesters, and copolymers containing polyoxyalkylene and/or polyorthoester units have one or more hydroxyl end groups. As a specific example, polyoxyethylene-polyoxypropylene-polyoxyethylene (POE-POP-POE) triblock copolymers, which are sold under the tradename Pluronic® by BASF have the following general structure:

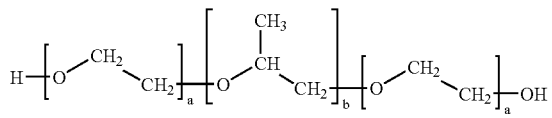

An end-capped polymer according to the invention would have one or both of the hydrogens of the hydroxyl groups removed and replaced with a different functional group. Preferably, the replacement functional group is a functional group that is less reactive than a hydroxyl group. More preferably the replacement functional group is a hydrocarbon group, such as a methyl group (—CH$_3$). Alternatively, the hydroxyl end groups could be replaced with other carbon-containing functional groups or a halogen group such as a fluoride, bromide or iodide group.

The demineralized bone powder used in the compositions according to the invention can be prepared according to a variety of different methods. Some conventional methods are identified in Jefferies, supra, and Glowacki et al., supra. Such conventional methods for preparing DBM include a defatting step and a demineralization step. Different methods of defatting, e.g., hot water, or chloroform/methanol washes, can be used. Demineralization can be performed according to a variety of different methods, generally using different types of acid solutions for varying times and at variable temperatures. The demineralized bone can be prepared in a variety of shapes and sizes. In a preferred embodiment, the demineralized bone is in the form of a powder and, more preferably, has a size in the range of about 100-850 μm.

Additional materials may be added to the tissue repair composition according to the invention, including both active and nonactive ingredients. These additional materials include collagen, gelatin, residual solids produced during the extraction process that may or may not contain residual BMPs, bone mineral, hydroxyapatite, tricalcium phosphate, biphasic calcium phosphate, calcium sulfate, biological glasses, and natural or synthetic polymers.

The biological, physicochemical and biodegradation properties of the tissue repair composition may be altered by known cross-linking agents such as chemicals (e.g., glutaraldehyde or formaldehyde) or radiation (e.g., gamma or electron beam). Preferably radiation is used as the cross-linking agent, and most preferably electron beam (E-beam) radiation is used to irradiate the wet or dry materials.

In another preferred embodiment, the tissue repair composition has the consistency of a gel or putty.

The following examples are included to demonstrate preferred embodiments of the invention. It should be appreciated by those of skill in the art that the techniques disclosed in the examples that follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

Example 1

A sample of Pluronic® F127 (BASF) is provided. The Pluronic® F127 molecules are transformed into their dilithium salts by dispersing the Pluronic® F-127 in an aprotic solvent such as tetrahydrofuran or an alkane with appropriate amounts of either n-butyllithium, commercially available in hexane solution, or lithium aluminum hydride, commercially available in solutions of THF.

Exposure of the Pluronic® F127 to butyllithium or to lithium aluminum hydride will lead to the evolution of an amount of either butane gas or hydrogen gas in proportion to the number of hydroxyl groups present in the Pluronic® F-127 molecule. From the average molecular weight of Pluronic® F-127 of 12,150, one can calculate that the proportion of hydroxyl groups present will cause a 1.25 gram-sample of Pluronic® F-127 to evolve 4.48 mL of gas at S.T.P. In order to generate a more accurately and readily measured volume of gas it is calculated that a 12.5 gram-sample of Pluronic® F-127 will lead to the evolution of 44.8 mL of gas at S.T.P. Thus, such gasometric measurements on the starting Pluronic® F-127 sample and such measurements conducted after the Pluronic® F-127 sample has been chemically modified will indicate the proportion of hydroxy groups initially present and will confirm that no hydroxyl groups are present in the chemically modified sample.

Once the Pluronic® F-127 sample is quantitatively transformed into its dilithium salt, an appropriate proportion of alkylating agent, namely methyl iodide will be added to complete the synthesis of the dimethyl ether derivative of Pluronic® F-127.

In order to ensure complete replacement of all lithiums by methyl groups the methyl iodide will be used in generous excess; since methyl iodide is quite volatile such excess methyl iodide will not be deleterious since it can be readily removed by evaporation of the reaction mixture. The resulting solution of dimethyl capped polymer molecules will be subjected to evaporation under reduced pressure in order to remove any traces of remaining methyl iodide or solvent. The end-capped polymer product may be recrystallize one or more times from a suitable solvent and thus the derivative can be purified by such selective crystallization from any small amounts of remaining impurities. As mentioned above, the final test for the complete absence of hydroxyl groups will be to expose purified product samples to lithium aluminum hydride solutions with the expectation that no hydrogen gas whatsoever should be evolved since there are no remaining hydroxyl groups. As a physical confirmation of the absence of such terminal hydroxyl groups, the purified derivative can be subjected in highly concentrated solutions to both infrared and proton NMR spectroscopic analyses.

Example 2

A tissue repair composition is prepared by combining about 25% weight of the end-capped polymer made according to Example 1 with 75% water. The mixture may need to be stirred for several hours at a cooled temperature in order to completely disperse the end-capped polymer. The mixture of end-capped polymer and water is then combined with an amount of demineralized bone powder to obtain a desired consistency. For example, the composition may contain at least 20-30% weight demineralized bone powder by weight of the overall composition. The composition may be provided in a sterile, single use package.

Example 3

Additional components may be added to the composition described in Example 2. Such components may include bone morphogenetic protein(s), collagen, gelatin, residual solids produced during the extraction process that may or may not contain residual BMPs, bone mineral, hydroxyapatite, tricalcium phosphate, biphasic calcium phosphate, calcium sulfate, biological glasses, and natural or synthetic polymers.

Example 4

Instead of the bone powder as described in Examples 2, one or more extracted and purified or recombinantly produced BMP's may be added to the end-capped polymer made according to Example 1.

We claim:

1. A polyoxyethylene-polyoxypropylene-polyoxyethylene triblock copolymer wherein both terminal hydroxyl groups in the triblock copolymer have been replaced with terminal methoxy groups and wherein the polyoxyethylene-polyoxypropylene-polyoxyethylene triblock copolymer
   is derived from a dilithium salt of a dihydroxy starting material, and wherein both of the terminal hydroxyl groups have been replaced with terminal methoxy groups as a result of chemical modification.

2. The compound of claim 1, wherein the degree of polymerization of both polyoxyethylene blocks is about 101 and the degree of polymerization of the polyoxypropylene block is about 56.

3. A method of making polyoxyethylene-polyoxypropylene-polyoxyethylene triblock copolymer wherein both terminal hydroxyl groups in the triblock copolymer have been replaced with terminal methoxy groups and wherein the polyoxyethylene-polyoxypropylene-polyoxyethylene triblock copolymer has no hydroxyl groups comprising:
   (a) providing a polyoxyethylene-polyoxypropylene-polyoxyethylene triblock copolymer with two terminal hydroxyl groups
   (b) contacting the polyoxyethylene-polyoxypropylene-polyoxyethylene triblock copolymer defined in step (a) with butyllithium or lithium aluminum hydride to form a dilithium salt and
   (c) contacting the product of step (b) with methyl iodide, resulting in complete conversion of all hydroxyl groups in the polyoxyethylene-polyoxypropylene-polyoxyethylene triblock copolymer of step (a) into methyl ethers.

4. The method of claim 3, wherein the degree of polymerization of both polyoxyethylene blocks is about 101 and the degree of polymerization of the polyoxypropylene block is about 56.

5. A composition comprising:
   (i) demineralized bone particles, and
   (ii) a polyoxyethylene-polyoxypropylene-polyoxyethylene triblock copolymer wherein both terminal hydroxyl groups in the triblock copolymer have been replaced with terminal methoxy groups and wherein the polyoxyethylene-polyoxypropylene-polyoxyethylene triblock copolymer wherein the polyoxyethylene-polyoxypropylene-polyoxyethylene triblock copolymer
   derived from a dilithium salt of a dihydroxy starting material and wherein all of the dihydroxy starting material is completely etherified as a result of chemical modification.

6. The composition according to claim 5, wherein the polyoxyethylene-polyoxypropylene-polyoxyethylene triblock copolymer defined in part (ii) is dispersed in water.

7. The composition according to claim 6, wherein the dispersion of the polyoxyethylene-polyoxypropylene-polyoxyethylene triblock copolymer defined in part (ii) in water exhibits reverse phase behavior.

8. The composition according to claim 5, wherein the composition is a tissue repair composition.

9. The composition according to claim 5, wherein the composition further comprises collagen, gelatin, BMIPs, bone mineral, hydroxyapatite, tricalcium phosphate, biphasic calcium phosphate, calcium sulfate, biological glasses, a natural polymer or a synthetic polymers.

* * * * *